United States Patent [19]

Sommer

[11] Patent Number: 5,062,616

[45] Date of Patent: Nov. 5, 1991

[54] SELF-PUMPING HYDROPNEUMATIC SHOCK ABSORBING STRUT

[75] Inventor: Norbert Sommer, Konigswinter, Fed. Rep. of Germany

[73] Assignee: Boge AG, Eitorf, Fed. Rep. of Germany

[21] Appl. No.: 516,627

[22] Filed: Apr. 30, 1990

Related U.S. Application Data

[63] Continuation-in-part of Ser. No. 349,004, May 9, 1989, Pat. No. 4,993,693.

[30] Foreign Application Priority Data

Apr. 29, 1989 [DE] Fed. Rep. of Germany ....... 3914385

[51] Int. Cl.$^5$ .......................... B60G 17/00; F16F 9/36
[52] U.S. Cl. .............................. 267/64.17; 188/322.17
[58] Field of Search .......................... 267/64.16, 64.17; 188/284, 315, 322.17

[56] References Cited

U.S. PATENT DOCUMENTS

| | | | |
|---|---|---|---|
| 3,480,269 | 11/1969 | Jewell et al. | 267/64.17 |
| 3,593,978 | 7/1971 | Lohr | 267/64.17 |
| 4,105,194 | 8/1978 | Smeltzer et al. | 267/64.17 |
| 4,469,315 | 9/1984 | Nicholls et al. | 267/64.17 |
| 4,577,840 | 3/1986 | Meller et al. | 267/64.17 |
| 4,650,042 | 3/1987 | Knecht et al. | 188/299 |
| 4,700,812 | 10/1987 | Moser | 188/1.11 |
| 4,723,640 | 2/1988 | Beck | 188/319 |
| 4,749,069 | 6/1988 | Knecht et al. | 188/299 |
| 4,749,070 | 6/1988 | Moser et al. | 188/299 |
| 4,785,920 | 11/1988 | Knecht et al. | 188/299 |

*Primary Examiner*—Robert J. Oberleitner
*Attorney, Agent, or Firm*—Nils H. Ljungman & Associates

[57] ABSTRACT

A self-pumping hydropneumatic shock absorbing strut for a vehicle with internal level regulation for adjustment toward a standard elevation of the vehicle body capable of operating on a standing vehicle without a separate extenal supply of energy. For this purpose, the working chamber of the shock absorbing strut is connected to a higher pressure reservoir which is mounted external to the working cylinder and has a flow passage to the working cylinder. The flow passage is provided with a check valve which can be released or opened when the elevation of the vehicle is significantly below the standard elevation. During the release or opening of the check valve, the flow passage is open to allow free flow in both directions. A pressure equilibrium between the higher pressure oil reservoir and a pressurized oil chamber normally connected to the working cylinder causes the adjustment toward the standard elevation.

16 Claims, 4 Drawing Sheets

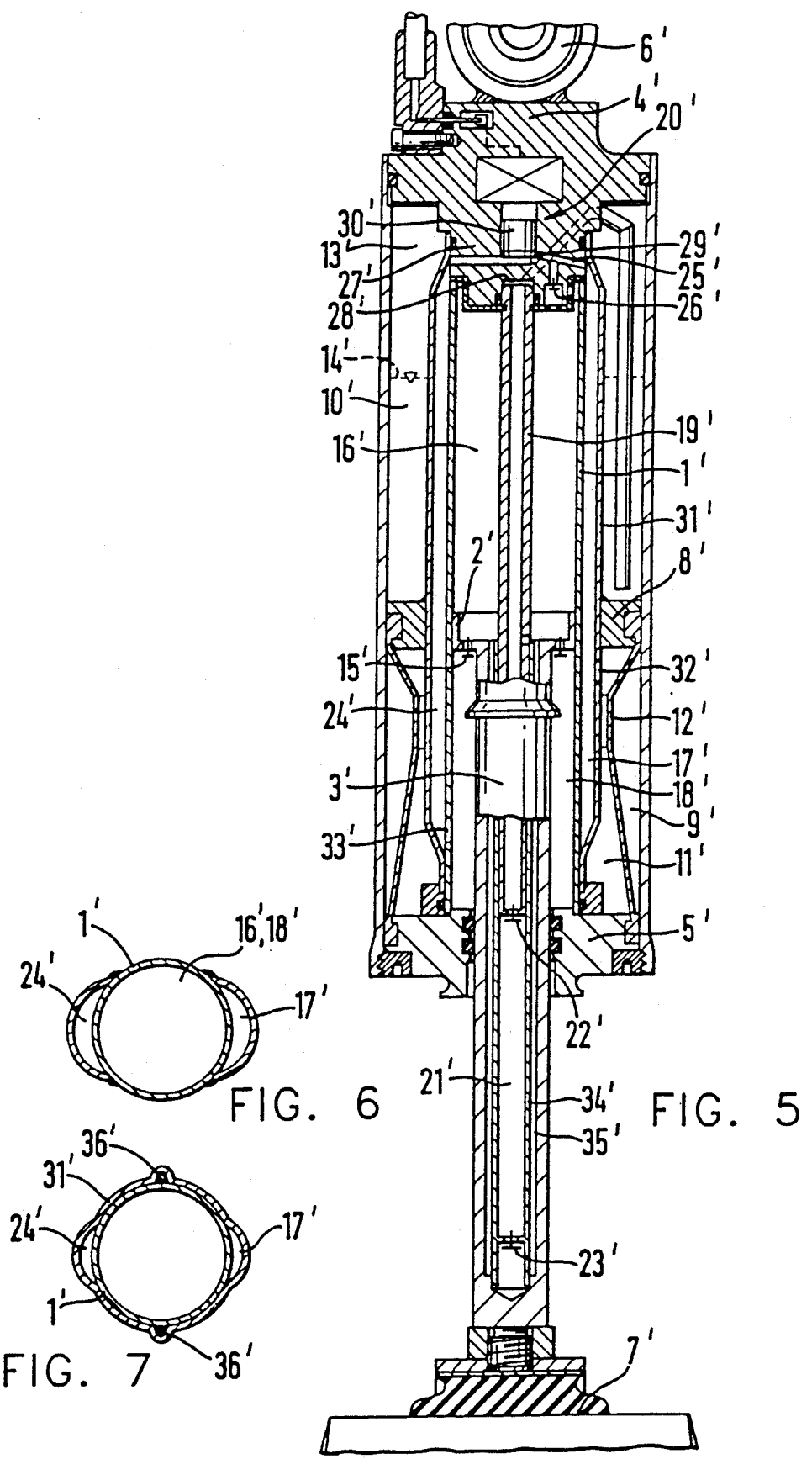

SELF-PUMPING HYDROPNEUMATIC SHOCK ABSORBING STRUT

The present application is a continuation-in-part of U.S. Pat. application Ser. No. 07/349,004, entitled "SELF-PUMPING HYDROPNEUMATIC SHOCK ABSORBING LEG WITH INTERNAL LEVEL REGULATION" filed May 9, 1989, now U.S. Pat. No. 4,993,693.

BACKGROUND OF THE INVENTION

1. F. .J of the Invention:

The invention relates to a self-pumping hydropneumatic shock absorbing spring leg or strut with internal lever regulation or control, in particular, for motor vehicles.

2. Background of the Invention:

Known versions of such devices include a working cylinder filled with oil or a damping medium, which oil or damping medium is under the pressure of at least one gas cushion located in a high pressure chamber. Such a device may act as a spring. The working cylinder is often divided by a piston into two working chambers. The piston is often supported by a hollow piston rod. The hollow piston rod includes a piston pump which is driven by the movements of the device or spring to transport the oil or damping medium from a low pressure chamber into the working chamber, which working chamber is connected to the high pressure chamber. The pump cylinder of the piston pump is formed by the hollow piston rod, into which piston rod extends a hollow pump rod which is fastened to the work cylinder and has a suction valve on its forward end. The hollow pump rod is connected to the low pressure chamber and connected with a deregulation chamber having a deregulation opening which can be closed as a function of the position of the piston in the working cylinder. The deregulating opening connects the working chamber, which working chamber is, in turn, connected with the high pressure chamber, with a deregulation passage having a throttle and empties into the low pressure chamber.

Self-pumping hydropneumatic shock absorbing struts, such as those disclosed in German Laid Open Patent Appln. No. 36 30 757, are already known. In such devices, during the travel of the vehicle, oil or damping medium is pumped into the working cylinder via the piston pump of the shock absorbing strut until the vehicle reaches a standard elevation. After the standard elevation has been reached, the working cylinder releases or exposes a deregulating opening so that, with the use of a short circuit or by-pass, further height adjustment of the vehicle body can be avoided. It is a disadvantage of this type of shock absorbing strut that, during the loading of the vehicle, the vehicle body is not brought up to the standard elevation immediately after the start of the vehicle but that the upward adjustment only occurs after a certain driven distance. The driven distance is required for the piston pump to transfer sufficient oil or damping medium into the working cylinder.

OBJECTS OF THE INVENTION

It is the object of the invention to improve a shock absorbing strut with inner level regulation so that a standing vehicle can achieve an upward adjustment toward the standard elevation of the vehicle body.

It is another object of the invention to provide a shock absorbing strut, such as mentioned above in which the upward adjustment is possible without a separate, exterior supply of energy.

SUMMARY OF THE INVENTION

These and other objects of the invention are provided by one of the work chambers being connected with a flow passage, is equipped with a check valve, to a highest pressure reservoir which is attached to the outside of the working cylinder. The check valve can be opened by means of an operating device. The unlocking pin of the operating device and the flow passage form a throttle.

An advantage in this configuration is that it is possible, by means of the highest pressure reservoir, to transfer the oil or damping medium into the working chamber of the standing vehicle, after the check valve has been unlocked or opened. A volume of oil or damping medium at the highest pressure for the functioning of the level control device is stored in the highest pressure reservoir during the filling of the shock absorbing struts. During the loading of the vehicle, the check valve is opened or unlocked and a volume of the stored oil or damping medium of the highest pressure reservoir is transferred into the highest pressure chamber to lift the vehicle. The return (for storage) of the volume of the oil or damping medium back into the highest pressure reservoir is accomplished during the driving process. The oil or damping medium is pumped into the highest pressure reservoir by the pressure peaks of the pull and push dampening action as well as the shock absorbing piston strokes whereby the required amounts of oil are being pumped from the low pressure chamber.

An important feature of a preferred embodiment of the invention includes the highest pressure reservoir being disposed axially next to the high pressure chamber.

Another advantageous feature is provided by the highest pressure reservoir, which is connected to the working chamber, being filled with oil and being impacted with a gas cushion. It is advantageous that the physical arrangement of the highest pressure reservoir corresponds to that of the high pressure chamber and employs the same general principle of operation. According to another preferred feature, there is an elastic membrane located between the gas cushion and the oil region of the highest pressure reservoir.

Another important feature provides that the operating device is activated by a stop which can be moved axially with the piston rod. It is also advantageous to have an elastic bumper or cushion as a stop.

One preferred embodiment, which is relatively simple to produce and is relatively inexpensive, provides a ball as a check valve, in which the ball can be preloaded by a spring. Providing an additional check valve in the connecting wall between the high pressure chamber and highest pressure reservoir permits an additional pumping by means of pressure stage dampening with the piston rod retracted.

One aspect of the invention resides broadly in a hydropneumatic shock absorbing strut for connection between relatively moveable first and second elements of a vehicle or the like, the first and the second elements each comprising one of axle device and body device of the vehicle, the shock absorbing strut comprising: an elongated working cylinder having a first end and a second end; the second end of the working cylinder having a piston rod hole therethrough; a piston mounted on a piston rod; the piston being disposed for movement within the working cylinder with the piston rod extending through the piston rod hole in the second end; the first end of the working cylinder for being connected to the first element; the piston rod for being connected to the second element: the working cylinder for having oil disposed therein; the oil in the working cylinder for damping movement of the piston within the working cylinder during relative movement of the first and the second elements; a high pressure oil reservoir for containing pressurized oil at a higher pressure than the oil . the working chamber when the vehicle is stopped: device, within the shock absorber strut, for pumping pressurized oil in the working cylinder into the high pressure oil reservoir when vehicle is moving; wholly mechanical sensing device, on the shock absorber strut, for mechanically sensing that the vehicle has descended to a first general position: wholly mechanical device within the shock absorber strut for supplying a quantity of pressurized oil from the high pressure oil reservoir to the working cylinder upon the sensing device sensing the first position of the vehicle: and the wholly mechanical device for supplying the quantity of the pressurized oil from the high pressure oil reservoir to the working cylinder for providing oil for movement of the piston and the vehicle from the descended, first position of the vehicle towards a raised, second general position of the vehicle.

Another aspect of the invention resides broadly in a hydropneumatic shock absorbing strut for connection between relatively moveable first and second elements of a vehicle or the like, the first and the second elements each comprising one of axle device and body means of the vehicle, the shock absorbing strut comprising: an elongated working cylinder having a first end and a second end; the second end of the working cylinder having a piston rod hole therethrough: a piston mounted on a piston rod; the piston being disposed for movement within the working cylinder with the piston rod extending through the piston rod hole in the second end; the first end of the working cylinder for being connected to the first element; the piston rod for being connected to the second element; the working cylinder for having pressurized oil disposed therein; the pressurized oil in the working cylinder for damping movement of the piston within the working cylinder during relative movement of the first and the second elements; the pressurized oil for being at a normal operating pressure during the damping movement of the piston: device for providing a predetermined quantity of the pressurized oil to the working cylinder for generally locating the piston at a first predetermined general position within the working cylinder during the relative movement of the first and the second elements; the piston being disposable at a second predetermined general position; the second predetermined general position being located within the working cylinder generally between the first end of the working cylinder and the first predetermined general position when the working cylinder includes a lesser quantity of the pressurized oil than the predetermined quantity of pressurized oil: a higher pressure oil reservoir for containing the pressurized oil at a higher pressure than the normal operating pressure; device for pumping the pressurized oil at at least the higher pressure to the higher pressure oil reservoir; wholly mechanical device for supplying an additional quantity of the pressurized oil from the higher pressure oil reservoir to the working cylinder prior to the relative movement of the first and the second elements when the piston is at the second predetermined general position; and the wholly mechanical device for supplying the additional quantity of the pressurized oil for adding the additional quantity of the pressurized oil to the lesser quantity of the pressurized oil for moving the piston from the second predetermined general position towards the first predetermined general position.

Yet another aspect of the invention resides broadly in a hydropneumatic shock absorbing strut for connection between relatively moveable first and second elements of a vehicle or the like, the first and the second elements each comprising one of axle device and body device of the vehicle, the shock absorbing strut comprising: an elongated working cylinder having a first end and a second end; the second end of the working cylinder having a piston rod hole therethrough: a piston mounted on a piston rod: the piston being disposed for movement within the working cylinder with the piston rod extending through the piston rod hole in the second end; the first end of the working cylinder for being connected to the first element; the piston rod for being connected to said second element; the working cylinder for having pressurized oil disposed therein; the pressurized oil in the working cylinder for damping movement of the piston within the working cylinder during relative movement of the first and the second elements; the pressurized oil including a normal operating pressure during the damping movement of the piston; device for providing a predetermined quantity of the pressurized oil to the working cylinder for generally locating the piston at a first predetermined general position within the working cylinder during the relative movement of the first and the second elements; the piston being disposable at a second predetermined general position; the second predetermined general position being located within the working cylinder generally between the first end of the working cylinder and the first predetermined general position when the working cylinder includes a lesser quantity of the pressurized oil than the predetermined quantity of the pressurized oil; a higher pressure oil reservoir for containing the pressurized oil at a higher pressure than the normal operating pressure; device for pumping said pressurized oil at at least the higher pressure to the higher pressure oil reservoir; for supplying an additional quantity of the pressurized oil from the higher pressure oil reservoir to the working cylinder prior to the relative movement of the first and the second element when the piston is at the second predetermined general position: the device for supplying the additional quantity of the pressurized oil for adding the additional quantity of the pressurized oil to the lesser quantity of the pressurized oil for moving the piston from the second predetermined general position towards the first predetermined general position; and all of the above components of the shock absorbing strut being integral and being connected one to the other to form said shock absorbing strut as one piece.

In a preferred embodiment, all of the components of the shock absorbing strut are integral and connected one to the other to form the shock absorbing strut as one piece.

BRIEF DESCRIPTION OF THE DRAWINGS

Examples of the preferred embodiments of the invention are explained with reference to the drawings described below.

FIG. 5 shows a vertical cross-section of a self-pumping hydropneumatic shock absorbing leg with internal road leveling control and an adjustable dampening valve.

FIGS. 6 and 7 depict a cross-section of the work cylinder together with a conduit and a second conduit for dampening medium circulation.

DESCRIPTION OF THE PREFERRED EMBODIMENTS

Figure 1:
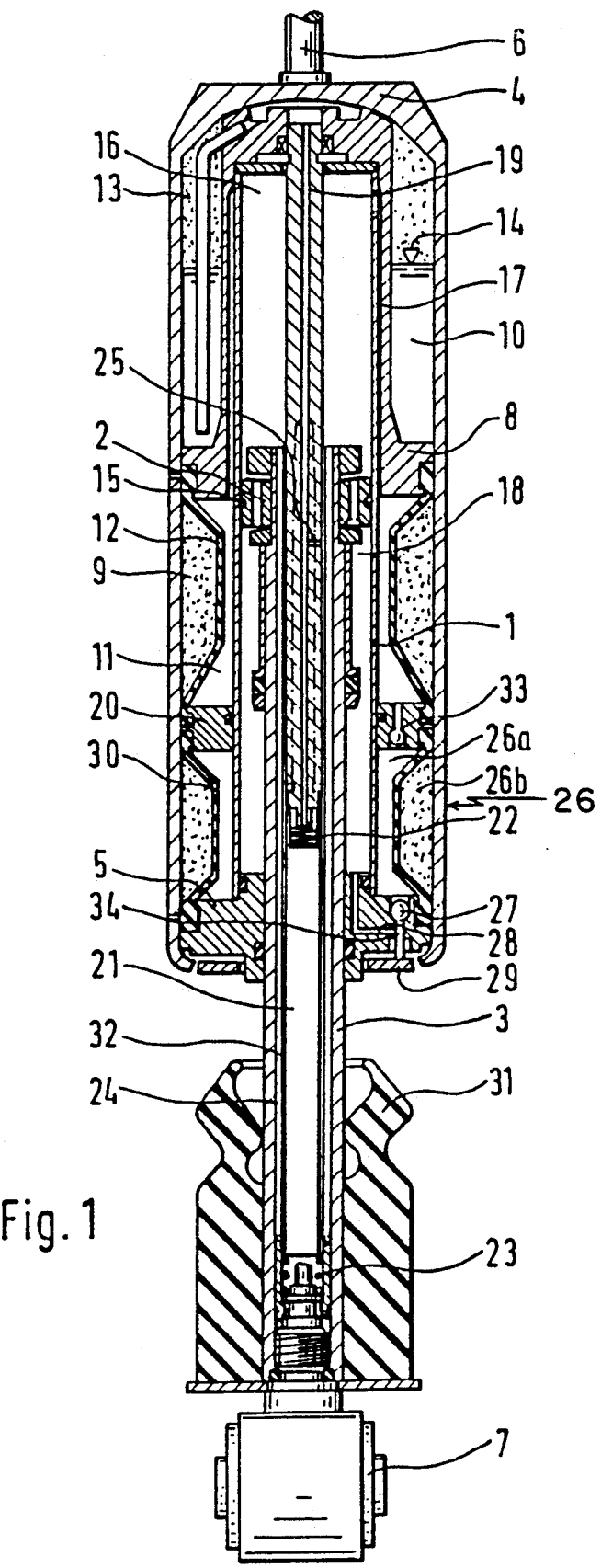
FIG. 1 is a sectional view of a self-pumping hydropneumatic absorbing strut with internal level regulation including various features of the invention.

The level regulation apparatus for motor vehicles, as shown in FIG. 1, comprises a working cylinder 1 of the shock absorbing strut. A piston 2 is mounted on the end of a piston rod 3 for movement within the working cylinder 1. The working cylinder 1 is closed at one end by a bottom 4 and at the other end by a cover 5, through which the piston rod 3, exits through a piston in a piston rod hole in a sealed manner. The bottom 4 is fastened by means of a fastening pin 6 onto the body of the vehicle in a manner known in the art. Similarly, the piston 2 and the piston rod 3 are fastened by means of a mounting part 7 onto the axle of the vehicle in a manner which is not shown but is also well known in the art.

As a result, relative movement between the body and the axle of the vehicle causes movement of the piston 2 within the working cylinder 1. The preferred working cylinder 1 is surrounded by a ring shaped or cylindrical compensation housing. The compensation housing is filled partly with oil and partly with gas and is divided by a partition 8 into a high pressure chambers 9,11 and a low pressure chamber 10. The high pressure chambers 9,11 is divided by a membrane 12 into an oil chamber 11 and a gas chamber 9. In the low pressure chamber 10, the oil at a level 14 and a low pressure gas cushion 13 are not separated from one another. In a completely blocked or closed off state, i.e. when not pumped up, the same pressure prevails in the low pressure chamber 10 and in the high pressure chambers 9,11.

An inner working chamber 16, between piston 2 and bottom 4, is connected to the oil chamber 11 of high pressure chambers 9,11 by means of a passage 17. An inner working chamber 18 which is located between piston 2 and cover 5 primarily operates by means of valves through piston 2 for communication with the working chamber 16 of working cylinder 1.

A pump rod 19 is fastened to the interior of the bottom 4. The pump rod 19 operates in conjunction with a control tube 32 which is located within the cavity of piston rod 3 to define a pump cylinder 21 of an oil pump. Movement of the vehicle along uneven roads cause relative movement of the vehicle axle and of the piston rod 3 fastened thereto. The resulting relative movement activates the oil pump which constantly transports oil, controlled by a suction valve 22 in the end of the pump rod 19, from the low pressure chamber 10 via a pressure valve 23 through a passage 24 into the working cylinder 1. As a result, the piston 2 and the piston rod 3 are displaced outwardly by the added quantity of high pressure oil in the working cylinder 1 until a deregulation or control opening 25 in the pump rod 19 is aligned to provide communication between the working cylinder 1, which is under high pressure, and the low pressure chamber 10, so that the deregulation or control function is initiated to discontinue further displacement of the piston 2. Piston ring 15 is disposed between working cylinder 1 and deregulation or control opening 25.

However, in the preferred level regulating apparatus, there is also provided a yet higher pressure or highest pressure reservoir 26.

The highest pressure reservoir 26, including an oil filled part 26a and a gas filled part 26b, is attached in the area of cover 5 and is located axially adjacent the high pressure chambers 9,11. The highest pressure reservoir 26 is divided from the high pressure chambers 9,11 by a wall 20 having a passage including a check valve 33 extending therethrough. The function of the passage and check valve 33 will be described hereinbelow. However, more significantly, the reservoir 26 includes a check valve 27 at the other end thereof. An operating device 29 of the check valve 27, which is configured to be activated by a stop 31 and an unloading pin 34, is capable of opening the check valve 27 to release the oil to the flow passage 28 for the working chambers 16,18 and thus the high pressure chambers 9,11. Check valve 27 is arranged in such a fashion that the entrance or supply of the oil from the reservoir 26 into the working and high pressure chambers is done in a throttled manner. During a short operating or activation time of the check valve 27, a rapid, undesired discharge of the highest pressure reservoir 26 is not possible. Throttling is provided by the ball of the check valve 27 and the insertion of the pin 34 into the passage 28.

After the lifting of the stop 31, which is preferably provided in the form of a bumper, the check valve 27 is returned to its closed position and continues to function as a check valve during operating pressure peaks from the work chamber 18 into the highest pressure reservoir 26. The reservoir 26 serves as a storage for the release of oil from the chambers 16,18 or 9,11. The release of the oil from the chambers 16,18 occurs via the check valve 27 whenever the pressure in the chambers 16,18 is elevated to a yet higher pressure by the peak pressure levels during tension and compression strokes of the piston 2, tending to pump the oil when it periodically reaches a pressure in the chambers 16,18 which is higher than the pressure in the highest pressure reservoir 26. The reduction of oil storage in the chambers 9,11 can also occur via the check valve 33 in the same manner during the damping process causing the peak pressure levels of the compression strokes.

Figure 2:
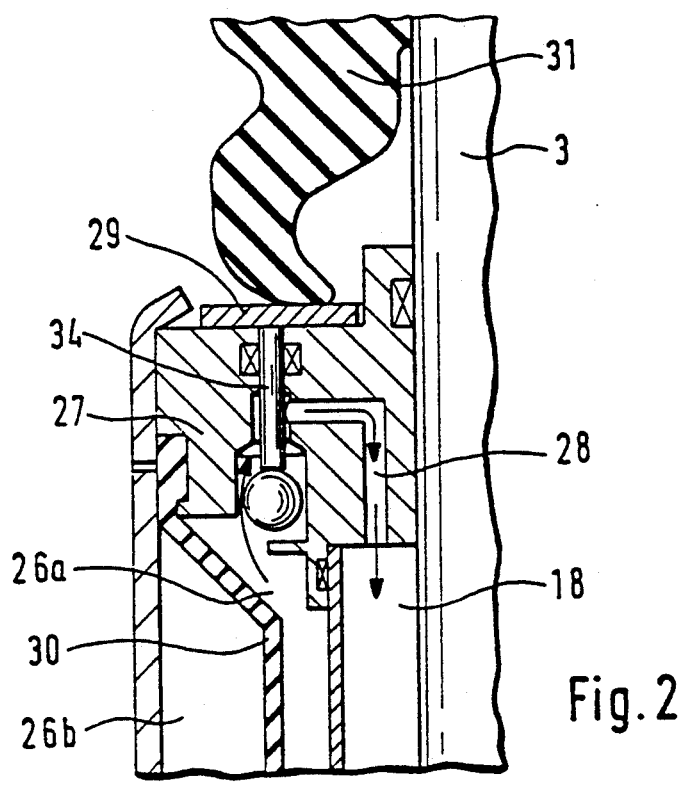
FIG. 2 is an enlarged, fragmentary cross-sectional view of a preferred check valve is rotated 180° from the position shown in FIG. 1.
Figure 3:
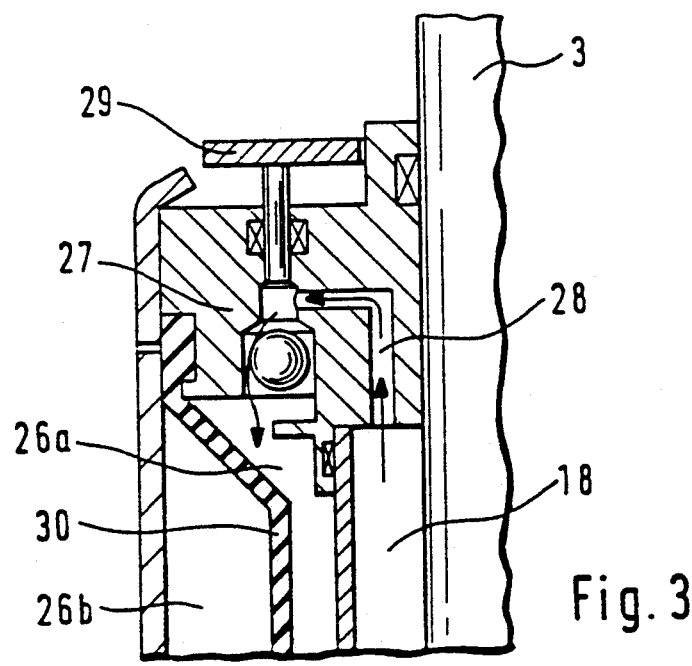
FIG. 3 is a view of the check valve of FIG. 2 in which the check valve is positioned for the oil to be returned from the working chamber into the highest pressure reservoir.

FIGS. 2 and 3 show an enlarged view of the check valve 27 with the highest pressure reservoir 26 being subdivided by a membrane 30 into the one oil filled part 26a and the one gas filled part 26b. The components included in the views of FIGS. 2 and 3 are rotated 180 degrees from the positions as shown in FIG. 1.

In FIG. 2, the operating device 29 is being activated by the stop 31, which is a preferred bumper, during the retraction of piston rod 3 into the working cylinder 1. As unlocking pin 34 of the operating device 29 tends to displace or lift the ball of the check valve 27 from its seat, the oil of the oil filled part 26a is throttled to flow into working chamber 18 through the sectional portion of the cover 5 including the unlocking pin 34 and the flow passage 28. The preferred bumper or stop 31 is configured in such a manner that it will operate the check valve 27 of a fully loaded vehicle while it is standing.

FIG. 3 shows the operation of the check valve 27 during the return pumping by the piston 2 with the piston rod 3 in the extended position. The pumping is produced by means of pressure peaks from the tension damping and the spring compression causes the oil at the higher pressure to flow, in an extending stroke, from working chamber 18, past flow passage 28 and the ball of check valve 27, and into the part 26a of the highest pressure reservoir 26. In a retracting stroke, as best seen in FIG. 1 and as discussed hereinabove, the oil at the yet higher pressure will flow from the working chamber 16, through passage 17 and chamber 11, and into the part 26a by way of the check valve 33. The gas in the gas filled part 26b is thus reloaded to that pressure produced during the initial stress conditions so that the highest pressure reservoir 26 is again in readiness for the next level control function.

Figure 4:
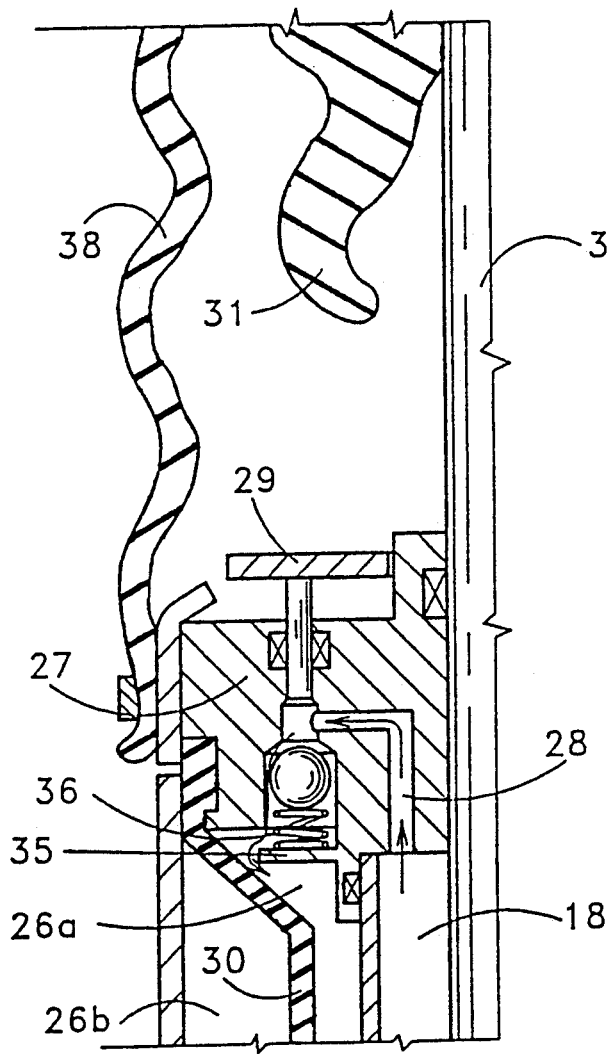
FIG. 4 is a view, similar to that of FIG. 3, of an alternative embodiment including various features of the in .ation.

As seen in FIG. 4, an alternative embodiment of the invention includes the ball of the check valve 27 being biased. Specifically, an interior wall 35 of the part 26a supports a spring 36 tending to bias the ball to the closed position against its seat. Biasing the check valve 27 in this manner provides further control of the yet higher pressure which can be pumped to the part 26a for basically refilling the part 26a for the next leveling action required. Such a biased check valve configuration may be desirable, for example, if it is found that the resulting peak pressures are at too high a level and extend for too great a period of time so that the amount of the yet higher pressure oil passing to the part 26a is greater than actually desired. Biasing the check valve in this manner allows the highest pressure reservoir 26 to generally be maintained at a predetermined higher pressure level than the normal high pressure level for operation of the working cylinder 1. As a result, mechanical actuation of the operating device 29 for displacing the ball of the check valve 27 could result in a greater quantity of oil being more quickly transferred to the working cylinder 1 for tending to return the piston 2 to the standard level prior to actual movement of the vehicle.

As also seen in FIG. 4, a boot or cover 38 may be added to the strut configuration to generally seal and protect the extended portion of the piston rod 3 and the operating device 29. The boot or cover 38, which is similar to that employed in U.S. Pat. No. 4,577,840, discussed hereinabove, is configured to expand and contract with the relative movement of the piston rod 3 within the cylinder 1 without affecting the overall basic operation of the preferred strut as described.

As described hereinabove, the preferred and alternative embodiments of the invention generally include positioning of the piston 2 within the working cylinder 1 at a standard elevation during movement of the vehicle. As seen in FIG. 1, the standard elevation is at a position at which the piston 2 is slightly extracted from that shown in FIG. 1 to be located in the cylinder 1 slightly below the passage 25. The pumping action discussed hereinabove during movement of the vehicle would tend to cause the piston 2 to be generally located at the standard elevation although there would be continued oscillating movement of the piston 2 in the cylinder 1 throughout operation of the vehicle. As generally explained hereinabove, the piston pump including the hollow piston rod and suction valve configuration includes a means for providing a predetermined quantity of high pressure oil to the working cylinder for generally locating the piston at the standard elevation so that the piston is at a first predetermined general position within the working cylinder during the relative movement of the vehicle axle and vehicle body.

However, when the vehicle is standing without any movement thereof, it is possible for the vehicle to be loaded so that the predetermined quantity of high pressure oil in the working cylinder will be displaced during forced retraction of the piston 2 into the cylinder 1. The displacement of some of the high pressure oil would generally be to the oil chamber 11 against the opposition of the gas chamber 9. With significant loading of the vehicle, the piston 2 can be retracted into cylinder 1 to a second predetermined position between the first predetermined position or standard elevation and the upper end of the cylinder 1. This second predetermined position is generally assumed by the piston 2 when there is initially very heavy loading to force a significant amount of the high pressure oil in the chambers 16,18 into the oil chamber 11. The lesser quantity of high pressure oil in the cylinder 1 when the piston 2 is at the second predetermined position allows the piston rod 3 to be further retracted into the cylinder 1 until the stop 31 is in a position for contracting and activating the operating device 29. The activation of the operating device 29 causes an additional quantity of high pressure oil from the highest pressure oil reservoir 26 to be supplied to the working cylinder 1, even though the vehicle is not moving, to produce any relative movement between the axle and the body of the vehicle. When the additional quantity of oil from the reservoir 26 is added to the lesser quantity of high pressure oil in the working cylinder 1 that exists when the piston 2 is at the second predetermined position, the piston 2 is moved toward the first predetermined position or standard elevation. This movement can occur when the vehicle is standing and prior to any relative movement of the vehicle which is needed for operation of the piston pump.

In summary, one feature of the invention resides broadly in a self-pumping hydropneumatic shock absorber strut with internal level regulation, in particular, for motor vehicles. The shock absorber includes a working cylinder filled with oil, under the pressure of at least one gas cushion, located in a high pressure chamber and acting as a spring. The working cylinder is divided by a piston supported by a hollow piston rod into two working chambers. A piston pump is driven by the movements of the spring to transport the oil from a low pressure chamber into the working chamber, which is connected to the high pressure chamber. The pump cylinder of a piston pump is formed by the hollow piston rod, into which extends a hollow pump rod fastened to the working cylinder and has a suction valve on its forward end. The hole in the pump rod is connected to the low pressure chamber with a deregulation chamber or passage and with a deregulation opening which can be opened or closed as a function of the position of the piston in the working cylinder. The deregulating opening connects the working chamber, connected with the high pressure chamber, with a deregulation passage having a throttle and emptying into the low pressure chamber. The shock absorbing strut is characterized by the fact that one of the outer working chambers 18 is connected with flow passage 28 by means of a check valve 27 which is attached to the highest pressure reservoir 26 and is located outside of working cylinder 1. Check valve 27 can be released by an operating device 29 so that oil can freely flow in both directions.

Another feature of the invention resides broadly in a shock AB absorbing strut which is characterized by the fact that the highest pressure reservoir 26 is axially attached next to the high pressure oil chamber 9.

Yet another feature of the invention resides broadly in a shock absorbing strut which is characterized by the fact that part 26a of the highest pressure reservoir 26 which is connected to working chamber 18, is filled with oil and is impacted by a gas cushion part 26b.

A further feature of the invention resides broadly in a shock absorbing strut which is characterized by the fact that an elastic membrane 30 is arranged between gas cushion part 26b and the oil filled part 26a of the highest pressure reservoir 26.

A yet further feature of the invention resides broadly in a shock absorbing strut which is characterized by the fact that the operating device 29 can be actuated by a stop 31, which is axially movable together with the piston rod 3.

Yet another further feature of the invention resides broadly in a shock absorbing strut which is characterized by the fact that an elastic cushion or bumper is designed for the stop 31.

An additional feature of the invention resides broadly in a shock absorbing strut which is characterized by the fact that a ball is utilized as check valve 27.

A yet further additional feature of the invention resides broadly in a shock absorbing strut which is characterized by the fact that the ball may be preloaded by a spring.

A further additional feature of the invention resides broadly in a shock absorbing strut which is characterized by the fact that check valve 33 is located in a dividing wall 20 between the high pressure oil chamber 9 and the highest pressure reservoirs 26.

A yet further additional feature of the invention shock absorbing strut which is characterized by the fact that flow passage 28 forms a throttle from the combined unlocking pin 34 of the check valve 27.

The level regulation apparatus (shock absorber) for motor vehicles depicted in FIG. 5 comprises the work cylinder 1' in which a piston 2' slides on the end of a hollow piston rod 3'. The work cylinder 1' is closed on one end by a member 4' and on the other end by another member 5', through which the piston rod 3' exits in a sealed manner. In a manner not shown, the bottom member 4' is fastened or affixed by means of a fastener 6' on the body of the vehicle and the piston rod 3' is fastened by means of a fastener 7' on another portion of the vehicle; e.g., on the axle of the vehicle. The work cylinder 1' is surrounded by a ring-shaped or annular compensation chamber filled partly with oil and partly with gas. It is divided by a partition 8' into a high pressure chamber 9', 11' and a low pressure chamber 10'. The high pressure chamber 9', 11' is divided by a diaphragm 12' into a damping medium chamber and a gas chamber, respectively.

In the low pressure chamber 10', the damping medium and the low pressure gas cushion 13' are in surface contact. The surface 14' between the damping medium and the gas cushion is indicated by a dashed line. When not pumped up, the same pressure prevails in the low pressure chamber 10' and in the high pressure chamber 9', 10'.

The dampening medium in the high pressure chamber 9', 11' is connected via the hole 32' and the circulation passage 17' leading into the flow connection 25' and the check valve 26' and into the work chamber 16'. From the work chamber 16', the damping medium flows only in one direction via the check valves 15' in the work piston 2' into the work chamber 18'. The flow travels from the work chamber 18' through the hole 33' and into the passage 24' and then to the adjustable valve 20', the valve body 30' of which is sealed against the valve seat 29'. If the flow connection 25' is open, the dampening medium flows either via the passage 17' to the high pressure chamber 9', 11' or if the piston 2' is extended, the dampening medium flows through the check valve 26' into the work chamber 16'. Depending on the activation of the adjustable valve, a softer or harder damping force is achievable.

For level control, in a hole 28' in the base body 27', a pump rod 19' is held in a rigid and sealed manner which forms an oil pump together with a control tube 34' located in the cavity of the piston rod 3' and acting as a pump cylinder 21'. The movements of the vehicle vis a vis the road surface and of the piston rod 3' fastened to it, caused by uneven spots, activate the oil pump, which constantly transports oil, controlled by the suction valve 22' from the low pressure chamber 10' via the pressure valve 23' through a hole 36' into the intermediate chamber or annulus 35' and then into the work cylinder 1'. The work piston 2' and the piston rod 3' with the control tube 34' are thereby pushed until a deregulation opening in the pump rod 19' makes a connection between the work chamber 16' under high pressure and via the hollow pump rod 19' with the low pressure chamber 10'. The deregulation function is thereby initiated.

The passage or conduit 24' and the circulation passage 17' are located so that they run outside the work cylinder 1' in the low pressure chamber 10' and the high pressure chamber 9', 11' respectively. FIG. 6 is a cross section of the work cylinder 1', wherein the passage 24' and the circulation passage 17' are rigidly connected with the work cylinder 1' and sealed. This connection can be made, for example, in the form of a soldered connection.

In FIG. 7, concentrically around the work cylinder 1', there is a tube 31', which forms the conduit 24' and the conduit 17'. The conduits are separated from one another by means of gaskets 36'. The shape of the passage 24', the circulation passage 17' and the grooves used to hold the gaskets can thereby be achieved by non-cutting shaping or forming.

In summing up, one aspect of the invention resides in a self-pumping hydropneumatic shock absorbing leg with internal level regulation, in particular for motor vehicles, with a work cylinder filled with a damping medium, under the pressure of at least one gas cushion located in a high-pressure chamber and acting as a spring. The work cylinder is divided by a work piston supported by a hollow piston rod into two work chambers, with a piston pump driven by the movements of the spring and which transports damping medium from a low pressure chamber into the work chamber connected to the high pressure chamber. The pump cylinder of the piston pump is formed by the hollow piston rod, into which extends a hollow pump rod fastened to the work cylinder and having a suction valve on its forward end. The hole in the pump rod is connected to the low pressure chamber and a deregulation opening which can be closed as a function of the position of the work piston in the work cylinder. The deregulation opening connects the work chamber, connected with the high pressure chamber, with a deregulation passage having a throttle, which empties into the low pressure chamber. The work piston 2' can be flowed through in one direction by the damping medium via at least one check valve 15'. A passage 24' runs from one work chamber 18' to an adjustable damping valve 20'. Starting from the damping valve 20', directly or indirectly, a flow connection 25' runs via at least one additional check valve 26' into the other work chamber 16'. A circulation passage 17' forms a connection to the high pressure chamber 11'.

Another aspect of the invention resides in that the base body 27' of the damping valve 20' holds the pump rod 19' in a hole 28' in a rigid or sealed manner.

Yet another aspect of the invention resides in that the additional check valve 26' is located in the base body 27' of the damping valve 20'.

Still yet another aspect of the invention resides in that the passage 24' and/or the circulation passage 17' are located outside the work cylinder 1'.

And still yet another aspect of the invention resides in that the passage 24' and/or the circulation passage 17' is formed by a tube 31', located concentrically around the work cylinder 1'. The tube 31', by means of partitions, separates the passage 24' and/or the circulation passage 17' from one another, and from the low pressure chamber 10' and high pressure chamber 11' respectively.

A further aspect of the invention resides in that the low pressure chamber 10' and/or the high pressure chamber 11' are located outside the shock absorbing leg as a separate component.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The invention as described hereinabove in the context of the preferred embodiments is not to be taken as limited to all of the provided details thereof, since modifications and variations thereof may by made without departing from the spirit and scope of the invention.

What is claimed is:

1. A hydropneumatic shock absorbing strut, for connection between relatively moveable first and second elements of a vehicle, said first and said second elements each comprising one of axle means and body means of said vehicle, said shock absorbing strut comprising:

an elongated working cylinder having a first end and a second end;

said second end of said working cylinder having a piston rod hole therethrough;

a piston mounted on a piston rod;

said piston being disposed for movement within said working cylinder with said piston rod extending through said piston rod hole in said second end;

said first end of said working cylinder for being connected to said first element;

said piston rod for being connected to said second element;

said working cylinder for having oil disposed therein;

said oil in said working cylinder for damping movement of said piston within said working cylinder during relative movement of said first and said second elements;

a high pressure oil reservoir for containing pressurized oil at a higher pressure than the oil in said working chamber when the vehicle is stopped;

means, within said shock absorber strut, for pumping pressurized oil in said working cylinder into said high pressure oil reservoir when vehicle is moving;

wholly mechanical sensing means, on said shock absorber strut, for mechanically sensing that the vehicle has descended to a first general position;

wholly mechanical means within said shock absorber strut for supplying a quantity of pressurized oil from said high pressure oil reservoir to said working cylinder upon said sensing means sensing the first position of the vehicle;

said wholly mechanical means for supplying said quantity of said pressurized oil from said high pressure oil reservoir to said working cylinder for movement of said piston and the vehicle from the descended, first position of the vehicle towards a raised, second general position of the vehicle;

wherein said sensing means comprises a projection mounted to move with said piston rod;

said oil supplying means comprising valve means; and said projection being disposed for pressing against and opening said valve means upon the vehicle attaining said first position for releasing pressurized oil from said high pressure oil reservoir for moving the vehicle to the raised second position.

2. A hydropneumatic shock absorbing strut for connection between relatively moveable first and second elements of a vehicle, said first and said second elements each comprising one of axle means and body means of said vehicle, said shock absorbing strut comprising:

an elongated working cylinder having a first end and a second end;

said second end of said working cylinder having a piston rod hole therethrough;

a piston mounted on a piston rod;

said piston being disposed for movement within said working cylinder with said piston rod extending through said piston rod hole in said second end;

said first end of said working cylinder for being connected to said first element;

said piston rod for being connected to said second element;

said working cylinder for having pressurized oil disposed therein;

said pressurized oil in said working cylinder for damping movement of said piston within said working cylinder during relative movement of said first and said second elements;

said pressurized oil in said working cylinder for being at a first operating pressure during said damping movement of said piston;

means for providing a predetermined quantity of said pressurized oil at a second pressure to said working cylinder for generally locating said piston at a first predetermined general position within said working cylinder during the relative movement of said first and said second elements;

said second pressure being greater than said first pressure;

said piston being disposable at a second predetermined general position;

said second predetermined general position being located within said working cylinder generally between said first end of said working cylinder and said first predetermined general position when said working cylinder includes a lesser quantity of said pressurized oil than said predetermined quantity of said pressurized oil;

a higher pressure oil reservoir for containing said pressurized oil at said second pressure;

means for pumping said depressurized oil in said working cylinder at said second pressure to said higher pressure oil reservoir;

wholly mechanical means for supplying quantity of said pressurized oil at said second pressure from said higher pressure oil reservoir to said working cylinder upon the relative movement of said first and said second elements when said piston is at said second predetermined general position;

said wholly mechanical means for adding said additional quantity of said pressurized oil to said lesser quantity of said pressurized oil for moving said piston from said second predetermined general position towards said first predetermined general position;

wherein said wholly mechanical means includes:

a connecting passage between said higher pressure oil reservoir and said working cylinder;

valve means in said connecting passage;

said valve means including a closure member for being disposed in one of an open position and a closed position;

means for opening said valve means in said connecting passage to said open position when said piston is in said second predetermined position; and wherein said means for opening said valve means includes moveable actuation pin means, said pin means has a first end and a second end, said first end of said pin means is disposed outwardly of said higher pressure oil reservoir, said second end of said pin means is disposed for making contact with closure member, and said first end is being moved to produce corresponding movement of said second end and of said closure member.

3. The sock absorbing strut according to claim 2, wherein said valve means includes a check valve, and said closure member of said check valve is normally in said closed position for closing said connecting passage until being moved to said open position by at least said means for opening.

4. The shock absorbing strut according to claim 3, wherein said check valve includes biasing means for biasing said closure member to said closed position.

5. The shock absorbing strut according to claim 4, wherein said check valve is a ball check valve and said closure member is a ball of said ball check valve.

6. The shock absorbing strut according to claim 2, wherein said means for opening said valve means is disposed at said second end of said working cylinder, said first end of said pin means is disposed outwardly of said second end of said working cylinder, said piston rod has stop means fixedly mounted thereon, and said first end of said pin means is alignable with said stop means.

7. The shock absorbing strut according to claim 6, wherein said stop means includes a resiliently deflectable cushion element mounted on said piston rod for movement toward and away from said second end of said working cylinder, and said movement of said stop means corresponds to said movement of said piston within said working cylinder.

8. The shock absorbing strut according to claim 6, wherein said higher pressure oil reservoir is disposed about said working cylinder and is adjacent said second end of said working cylinder.

9. The shock absorbing strut according to claim 8, wherein said higher pressure oil reservoir includes an oil part and a gas filled part, said higher pressure oil reservoir includes a membrane between said oil part and said gas filled part, and said oil part is in communication with said connecting passage.

10. The shock absorbing strut according to claim 9, wherein said valve means includes a check valve, said closure member of said check valve for being normally in said closed position for closing said connecting passage until being moved to said open position by at least said means for opening, and said means for pumping said pressurized oil at at least said higher pressure to said higher pressure oil reservoir includes:

said connecting passage, means for having said pressurized oil in said higher pressure oil reservoir at a reduced pressure below said higher pressure;

means for having said pressurized oil in said working cylinder at least at said higher pressure, and said check valve being moved to said open position by said pressurized oil in said working cylinder at said higher pressure.

11. The shock absorbing strut according to claim 10, wherein said means for providing said predetermined quantity of said pressurized oil includes at least a pressurized oil chamber, said pressurized oil chamber is connected to said working cylinder, said pressurized oil chamber for having pressurized oil therein, said pressurized oil chamber is disposed about said working cylinder adjacent to said higher pressure oil reservoir, said pressurized oil chamber and said higher pressure oil reservoir have wall means disposed therebetween, said wall means has flow passage means between said high pressurized oil chamber and said higher pressure oil reservoir, and said means for pumping said pressurized oil at least said higher pressure to said higher pressure oil reservoir further includes:

said flow passage means, check valve means in said flow passage means, means for having said pressurized oil in said higher pressure oil reservoir being at said reduced pressure below said higher pressure, means for having said pressurized oil in said pressurized oil chamber being at least at said higher pressure, and said check valve means in said flow passage means for being moved to an open position by said pressurized oil in said pressurized chamber at said higher pressure.

12. The shock absorbing strut according to claim 11, wherein said means for providing said predetermined quantity of said pressurized oil includes an oil supply chamber and piston pump means for pumping oil from said oil supply chamber to said working cylinder, and said oil supply chamber is disposed about said working cylinder at said first end of said working cylinder and adjacent to said pressurized oil chamber.

13. The shock absorbing strut according to claim 12, further including gas cushion means for subjecting said pressurized oil chamber to at least said normal operating pressure.

14. The shock absorbing strut according to claim 6, wherein said first end of said pin means is disposed within said connecting passage, and said first end of said pin means and said closure member form throttle means for throttling a flow of said additional quantity of said pressurized oil through said connecting passage.

15. A hydropneumatic shock absorbing strut for connection between relatively moveable first and second elements of a vehicle, said first and said second elements each comprising one of axle means and body means of said vehicle, said shock absorbing strut comprising:
- an elongated working cylinder having a first end and a second end;
- said second end of said working cylinder having a piston rod hole therethrough;
- a piston mounted on a piston rod;
- said piston being disposed for movement within said working cylinder with said piston rod extending through said piston rod hole in said second end;
- said first end of said working cylinder for being connected to said first element;
- said piston rod for being connected to said second element;
- said working cylinder for having pressurized oil disposed therein;
- said pressurized oil in said working cylinder for damping movement of said piston within said working cylinder during relative movement of said first and said second elements;
- said pressurized oil including a normal operating pressure during said damping movement of said piston;
- means for providing a predetermined quantity of said pressurized oil to said working cylinder for generally locating said piston at a first predetermined general position within said working cylinder during the relative movement of said first and said second elements;
- said piston being disposable at a second predetermined general position;
- said second predetermined general position being located within said working cylinder generally between said first end of said working cylinder and said first predetermined general position when said working cylinder includes a lesser quantity of said pressurized oil than said predetermined quantity of said pressurized oil;
- a higher pressure oil reservoir for containing said pressurized oil at a higher pressure than said normal operating pressure;
- means for pumping said pressurized oil at least said higher pressure to said higher pressure oil reservoir;
- means for supplying an additional quantity of said pressurized oil from said higher pressure oil reservoir to said working cylinder prior to the relative movement of said first and said second elements when said piston is at said second predetermined general position;
- said means for supplying said additional quantity of said pressurized oil for adding said additional quantity of said pressurized oil to said lesser quantity of said pressurized oil for moving said piston from said second predetermined general position towards said first predetermined general position;
- wherein said means for supplying an additional quantity of said pressurized oil means includes:
- a connecting passage between said higher pressure oil reservoir and said working cylinder;
- valve means in said connecting passage;
- said valve means including a closure member for being disposed in one of an open position and a closed position;
- means for opening said valve means in said connecting passage to said open position when said piston is in said second predetermined position;
- wherein said means for opening said valve means includes moveable actuation pin means, said pin means has a first end and a second end, said first end of said pin means is disposed outwardly of said higher pressure oil reservoir, said second end of said pin means is disposed for making contact with closure member, and said first end is for being moved to produce corresponding movement of said second end and of said closure member; and
- wherein said means for opening said valve means is disposed at said second end of said working cylinder, said first end of said pin means is disposed outwardly of said second end of said working cylinder, said piston rod has stop means fixedly mounted thereon, and said first end of said pin means is alignable with said stop means.

16. The shock absorbing strut according to claim 15, wherein said stop means includes a resiliently deflectable cushion element mounted on said piston rod for movement toward and away from said second end of said working cylinder, and said movement of said stop means corresponds to said movement of said piston within said working cylinder.

* * * * *